Jan. 12, 1960     D. B. PECK ET AL     2,921,246

ELECTRICAL CONDENSERS

Filed March 29, 1956

*INVENTOR.*
PRESTON ROBINSON
BY     DAVID B. PECK

Roland A. Dexter
their Attorney

United States Patent Office
2,921,246
Patented Jan. 12, 1960

2,921,246

ELECTRICAL CONDENSERS

David B. Peck and Preston Robinson, Williamstown, Mass., assignors to Sprague Electric Company, North Adams, Mass., a corporation of Massachusetts Application March 29, 1956, Serial No. 574,752

3 Claims. (Cl. 317—260)

This invention relates to new and improved condenser sections, and more particularly to a means, as well as a process, for terminating convolutely wound resin dielectric condenser sections.

This application is a continuation-in-part of our copending application, Serial No. 237,050, filed July 16, 1951, now U.S. Letters Patent 2,740,732, issued April 3, 1956.

A great many attempts have been made to manufacture condenser sections without the use of separate electrode foils by applying a metal film to a dielectric sheet. None of these attempts have proved completely satisfactory because of the limitations of the specific dielectric used.

In our parent application, we have taught the adequate bonding of a metal film to the surface of an oriented resinous dielectric. This successful metallization of a polyester resin film utilized the surface disorientation of the linearly oriented dielectric film. The character of the metallized coating was such that it not only achieved an intimate bonding to the resin dielectric, but was mechanically stable during the subsequent processing steps in the production of convolutely wound metallized dielectric capacitors. With such linearly oriented dielectric resins, conventional electrode termination processes have not proved satisfactory. Usually, the termination difficulties have been excessive localized heating to high resistance and/or mechanical fracture of the terminal, which adversely affect the electrical contact between the lead wire and the active electrode.

It is an object of this invention to overcome these and other defects in the termination of capacitors employing metallized oriented dielectric films. Another object is to produce capacitor sections which are superior to the metallized film type capacitors which are currently produced. These and other objects of the invention will be apparent from the specification and claims, as well as the drawing in which:

Figure 1:
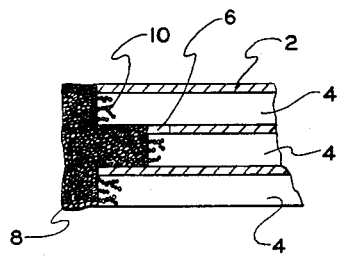
Fig. 1 shows in cross-section the termination of a capacitor section employing metallized dielectric films which are physically offset.

The foregoing objects are obtained by virtue of the discovery that sprayed metal particles under certain conditions can be caused to be both electrically bonded to the metallized coating, and mechanically bonded to a sheet of substantially linear polyester polymers conforming to the general recurrent formula:

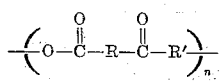

in which R represents a bivalent radical containing the benzene nucleus, and in which R' represents a bivalent aliphatic radical containing from 2 to 3 carbon atoms. The temperature of the metal particles as they contact the dielectric resin sheet are of prime importance in obtaining a satisfactory mechanical bond to the dielectric resin. Further, the surface disorientation of these dielectric resins is requisite to obtain a satisfactory mechanical bond. Thus the invention here involved consists of making the molecules on the surfaces of the ends of the resin sheet randomly oriented so that a substantial mechanical bond is produced between the sprayed metal film and the resin sheet, and further, under such conditions that the particles penetrate into the surface region of the resin film in such a fashion that a mechanical bond is produced.

According to the embodiment of the invention which is of particular utility in forming terminal connections, one obtains this metal to resin bond by spraying a heavy metal layer directly onto a resin surface while the latter is held at a temperature sufficient to completely relax and disorient the molecular arrangement of this surface by means of the increased surface temperature arising out of the impingement of the metal particles onto it.

A preferred dielectric film for use herein is a linear condensation polymer of ethylene glycol and terephthalic acid, which will hereafter be defined as polyethylene terephthalate. Other acceptable polyesters are the oriented condensation polymers of terephthalic acid with propylene or butylene glycol and of chlorinated or otherwise substituted di-basic aromatic acids and substituted glycols, which will condense to form linear polymers.

With most vapor deposited metallic films, it is preferable to first apply a thin condensed undercoat of silver or molybdenum to the resin surface. This application of metal, as well as the subsequent deposition, is accomplished under conditions such that the orientation of the resin, including the surface, is unaffected by the heat of condensation of the metal vapor and the layer provides nuclei for subsequent metal deposition. Copper, zinc, lead, aluminum and other metals may then be metallized over this base coat under such conditions that the heat of condensation does disorient the surface orientation of the film to produce the "self-healing" electrodes.

In an example of this embodiment, 0.25 mil thick polyethylene terephthalate films are first coated with sufficient silver to provide the surface of the resin with crystal forming nuclei. The silvering is accomplished at a reduced pressure of about 10 microns of mercury. A film speed of 90 feet per minute was used, and the film was backed by a water-cooled (about 20° C.) smooth platen at the point of silver deposition. The silver is placed in small amounts in a heated pot and maintained at from 1100° F. to 1200° F. Subsequent to this, the polyethylene terephthalate film was passed through a metallizing apparatus under such conditions that the temperature of the principal portion of the film does not advance beyond 130° C. in temperature, while the surface of the polyester is approximately 200° C. With other resins besides polyethylene terephthalate which conform to indicated groups, other treatment conditions are employed such that merely the surface of the polyester is disoriented. The same materials and procedures may be used with this embodiment as have been previously set forth.

For application of heavy metal layers, as in the provision of terminal connections to rolled capacitor edges, these same metals and also alloys may be sprayed directly onto the edges of the polyester film of the indicated variety under conditions such that the surface of the film is at a temperature above its melting point. Heated vapors and particles of these metals can be used in this manner. A firm fused metal-to-resin bond is obtained because of the interspersing of metal particles contiguous with the sprayed terminal mass in a random fashion in the molten resin surface mass, which upon cooling, is, of course, disoriented.

Referring now to Fig. 1, the partial cross-section of a convolutely wound capacitor shows the metallized electrodes 2, disposed upon their respective polyester dielectric films 4, which films function as the active dielectric and separate the adjacent electrodes. In this construction, the dielectric films 4 are in offset relationship, and are of course margined on one edge of a metallized surface which margin areas are indicated by 6. The lead wire which extends from the capacitor electrode is secured by means of a sprayed deposited metal layer 8, which consists of an enlarged spongy metallic mass produced by condensation of sprayed metal particles upon the exposed ends of the capacitor section. The sprayed mass 8 is seen to intimately contact, and be allied with, the appropriate electrode metallized layer, and additionally, is mechanically secured to the disoriented surface of the dielectric film. In addition to obtaining excellent adhesion by means of the disorientation of the resin surface against which the sprayed metal deposit is positioned, the sprayed metal penetrates into the body of the resin as particles contiguous with the deposit to form a mechanical bond which further secures the sprayed mass to the dielectric. The disorientation of the surface against which the metal is disposed must occur in order to get satisfactory adhesion.

Figure 2:
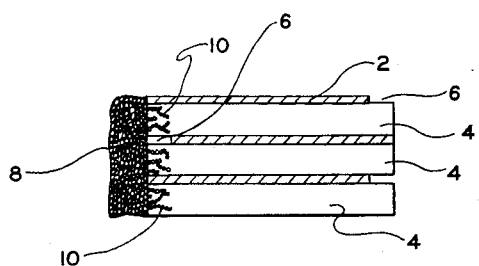
Fig. 2 shows in cross-section the termination of aligned metallized dielectric films of a capacitor.

In Fig. 2, we find substantially the same construction of termination shown in Fig. 1 with the exception that the dielectric films with their deposited electrodes are not in offset relationship. The numerals of Fig. 2 refer to the same structure as their counterparts in Fig. 1. The dispersed metallic particles 10 project into the resin body approximately 0.0001 inch and for optimum mechanical strength should extend from about 0.0001 inch to 5/10,000 of an inch into the dielectric.

Figure 3:
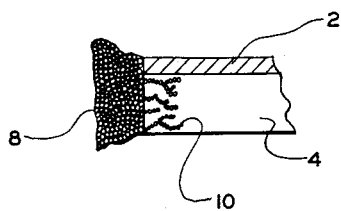
Fig. 3 is a more detailed view of the termination to the metallized electrode of the dielectric.

Fig. 3 shows an enlarged view of the spray deposited coating 8 with the metal particles 10 positioned on and in the end of a linearly oriented polyester sheet 4 having vacuum deposited metal electrode 2. The body of the dielectric 4 retains its oriented state and only those surfaces which are bearing the vapor deposited metallized electrode 2 and the spray deposited coating 8 are disoriented.

As an example of this invention, the edges of capacitors wound with 0.25 mil thick polyethylene terephthalate film were provided with terminal connections by being sprayed with a zinc metal whose particle temperature at the moment of contact with the film was between 250° C. and about 420° C. at atmospheric pressure. Prior to spraying the capacitor section, the metallized dielectric film was assembled into the convolutely wound capacitor structure, and heated above the relaxation temperature of the resin, that is between 165° C. and 218° C., so as to partially shrink the structure in accordance with the teachings of our U.S. Letters Patent 2,735,970, issued February 21, 1956. The spray deposited metals which may be used in our termination include any of those taught as suitable for spraying by the art, such as aluminum, copper, nickel, lead, tin and alloys thereof. The important limitation of the process is that the particles at the moment of contact should have a temperature between about 250° C. and about 420° C. at atmospheric pressure. The lead-tin alloy (50% lead–50% tin) has proven exceptionally satisfactory for the termination of these metallized polyethylene terephthalate dielectric capacitors. The lead-tin ratio preferably should be from about 45:55 to about 55:45. It is believed that the deposited metal termination should be not truly liquid, but somewhat slushy as it strikes the capacitor end. This alloy is held as a melt at 600°±50° F. in a pot having an opening in the bottom. The alloy is sprayed onto the end of the capacitor as metal particles concurrent with air pressure of about 100±20 lbs. per square inch introduced by means of a plurality of openings surrounding the alloy orifice. The air is preheated to about 800±100° F. and assists in driving the particles at the capacitor end.

The above device can be modified by the deposition of increased thickness of metal at the edge of the film in order to materially reduce the electrical resistance of the joint. This ratio of the metal film thickness at the edge of the dielectric to the metal film thickness along the body of the capacitor is at least 2 to 1 and preferably 3 to 1.

Of course, it is understood that the coated polyester films which have been terminated by the structure of the invention are successfully used with other additional dielectric films such as films of polystyrene, impregnated paper and the like. Such additional films may be bonded directly to the polyester, or may comprise a separate sheet.

As many apparently widely different embodiments of this invention may be made without departing from the spirit and scope thereof, it is to be understood that the invention is not limited to the specific embodiments hereof except as defined in the appended claims.

We claim:

1. In a convolutely wound linearly oriented polyethylene terephthalate film dielectric capacitor comprising a plurality of vapor deposited metal electrodes, each disposed upon a surface disoriented linearly oriented polyethylene terephthalate film, an improved electrode termination consisting of a layer of sprayed metal particles disposed across the end of said wound capacitor, and in contact with both said vapor deposited electrode and exposed disoriented end surfaces of said oriented film, sprayed particles contiguous with said layer extending from about 0.0001 inch to 0.0005 of an inch into said disoriented dielectric surface in a random manner.

2. A process for providing an electrode termination for convolutely wound polyethylene terephthalate film dielectric capacitors having a plurality of vapor deposited metal electrodes disposed on, and separated by, surface disoriented linearly oriented polyethylene terephthalate films, said process including the step of spraying the end of the convolutely wound roll with metal particles whose temperature at the moment of contact with the capacitor end is above the disorientation temperature of said film and is between 250° C. and 420° C. at atmospheric pressure, so as to effect electrical and mechanical connection with the deposited metal electrode and the film dielectric.

3. A process for providing a terminal on a convolutely wound metallized linearly oriented polyester resin capacitance section which comprises spray depositing metal on an end of the section at a temperature above the disorientation temperature of the polyester resin and between about 250° C. and about 420° C. at atmospheric pressure, while the body of the section is at a temperature lower than the disorientation temperature of the polyester resin.

References Cited in the file of this patent

UNITED STATES PATENTS

| 2,047,452 | Zahodiakin | July 14, 1936 |
| 2,172,604 | Blackburn | Sept. 12, 1939 |
| 2,323,020 | Dorn | June 29, 1943 |
| 2,689,805 | Croze | Sept. 21, 1954 |
| 2,740,732 | Peck | Apr. 3, 1956 |

FOREIGN PATENTS

| 369,309 | Great Britain | Mar. 24, 1932 |

UNITED STATES PATENT OFFICE
CERTIFICATE OF CORRECTION

Patent No. 2,921,246                            January 12, 1960

David B. Peck et al.

It is hereby certified that error appears in the printed specification of the above numbered patent requiring correction and that the said Letters Patent should read as corrected below.

Column 1, lines 66 to 68, the formula should appear as shown below instead of as in the patent:

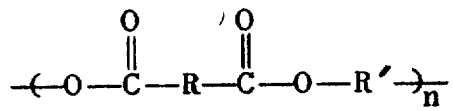

Signed and sealed this 19th day of July 1960.

(SEAL)
Attest:

KARL H. AXLINE                                   ROBERT C. WATSON
Attesting Officer                               Commissioner of Patents